United States Patent [19]

Baines et al.

[11] 4,444,595

[45] Apr. 24, 1984

[54] CEMENTITIOUS COATING COMPOSITION

[75] Inventors: John E. Baines; Thomas A. Pilgrim; Albert W. Thornhill; Malvern J. T. Tedds, all of Nottingham, England

[73] Assignee: BPB Industries Limited, London, England

[21] Appl. No.: 458,616

[22] Filed: Jan. 17, 1983

Related U.S. Application Data

[63] Continuation of Ser. No. 289,088, Jul. 31, 1981, abandoned.

[30] Foreign Application Priority Data

Aug. 1, 1980 [GB] United Kingdom ............... 80 25158

[51] Int. Cl.$^3$ ...................... C04B 7/14; C04B 11/00; C04B 31/10
[52] U.S. Cl. .................................. 106/109; 106/110; 106/117; 423/230; 34/81; 52/515
[58] Field of Search ...................... 106/109, 110, 117; 423/555, 230; 52/515; 34/81

[56] References Cited

U.S. PATENT DOCUMENTS 1,914,061  6/1933  Witty ..................................... 106/109

FOREIGN PATENT DOCUMENTS 46-12469  3/1971  Japan .................................... 106/110
49-132131 12/1974 Japan .................................... 106/109
51-55316  5/1976  Japan .................................... 106/109
53-13632  2/1978  Japan .................................... 106/117
53-13624  2/1978  Japan .................................... 106/117
55-80747  6/1980  Japan .................................... 106/117

Primary Examiner—Gary P. Straub
Attorney, Agent, or Firm—Birch, Stewart, Kolasch and Birch

[57] ABSTRACT

Possible emission of hydrogen sulphide from building materials incorporating a sulphide-containing constituent, for example ground blast furnace slag, can be suppressed or prevented by the application of a surface covering composition containing gypsum plaster and a metal compound capable of reacting with hydrogen sulphide to form a stable sulphide. It is preferred that the metal compound should have no substantial effect on the setting rate of the gypsum plaster, and may for example be an insoluble compound, while it is also preferred that the sulphide should be colorless and insoluble. Preferred metal compounds are zinc compounds and especially zinc oxide. Surface covering compositions for the purposes of the invention may contain from 0.01 to 1% by weight of the metal compound. The sulphide-containing constituent may be in a building structure or may itself be contained in a surface covering composition of rendering. In such a composition or rendering, blast furnace slag or other pozolanic or latent cementitious materials, have the advantage that they afford rapid surface drying while retaining advantages of rapid and controllable set. The risk of hydrogen sulphide emission under wet conditions is avoided by the invention. The metal compound may be included in the same composition as the sulphide-containing material, for example in a composition comprising by dry weight 20 to 84% gypsum plaster, 15 to 79% sulphide-containing aggregate, and 0.01 and 1% metal compound. Alternatively, the metal compound may be included in a finishing material comprising 97.8% to 99.9% gypsum plaster, up to 2% lime and 0.05 to 0.2% zinc oxide. The latter composition may also be applied to the surface of building structures including sulphide-containing components, for example building blocks containing blast furnace slag.

14 Claims, No Drawings

CEMENTITIOUS COATING COMPOSITION

This application is a continuation of copending application Ser. No. 289,088, filed on July 31, 1981, now abandoned.

The present invention relates to cementitious coating compositions suitable for use in covering the surfaces of building structures, for example walls or ceilings.

Interior surfaces of building structures, notably walls and ceilings, have traditionally been coated, prior to final decoration, with plastering compositions based on calcium sulphate plasters. Such compositions have the advantage of a rapid and controllable rate of set, which can be adjusted to an optimum value to ensure good working properties combined with a reasonably short setting time. They do, however, have the disadvantage that they dry from the surface of the applied layer, so that it is usual to apply the final decoration only when the coating is completely dry, and also that the strength of the coating remains low until it is dry. Rapid surface drying and thus earlier decoration can be achieved, without relinquishing the advantages of rapid and controllable set, by mixing another cementitious component with the plaster, notably a pozzolan or latent cement such as quenched or granulated blast-furnace slag. Unfortunately, such materials commonly include a sulphide impurity which in wet conditions can slowly release hydrogen sulphide gas. While the quantities of such gas released are very low and usually well below the permissible threshold limit values, they can give rise to an unpleasant smell in enclosed premises, and compositions containing such materials will not be acceptable unless this difficulty is overcome. Furthermore, there are other building products which incorporate cementitious materials which may also contain sulphide impurities, and are therefore liable to release hydrogen sulphide in damp conditions, for example slag blocks.

We have now found that the release of hydrogen sulphide into the atmosphere from building products containing sulphide impurities under wet conditions can be prevented by employing a cementitious or hydraulic surfacing composition containing a small quantity, preferably 0.01 to 1.00%, of a compound of a metal that forms a stable, and preferably insoluble, sulphide by reaction with hydrogen sulphide. The metal compound may be included in a coating incorporating a sulphide-containing cementitious component, to reduce or inhibit the release of hydrogen sulphide from such coating, or in a cementitious or hydraulic coating to prevent the release into the atmosphere of hydrogen sulphide produced from sulphide impurities in an underlying coating or structure. The coating is preferably based on gypsum plaster, by reason of the rapid and controlled set that can be achieved with this material, but the principles of the invention are applicable to other coating compositions, since the effectiveness of the metal compound does not depend on the presence of calcium sulphate.

According to one aspect of the present invention, an improved coating composition for building structures comprises a cementitious or hydraulic material and a small quantity of a compound of a metal forming a stable sulphide by reaction with hydrogen sulphide, the quantity of metal compound being sufficient to prevent release of hydrogen sulphide from a building structure surfaced with the coating.

The coating compositions of this invention may be employed to coat building structures constructed from sulphide-containing building components, such as slag blocks, or to coat building structures constructed from a wide variety of materials which have then been provided with an undercoat incorporating sulphide-containing cementitious components, such as the compositions of gypsum plaster and slag referred to above. Such plaster and slag compositions may themselves contain the metal compound to reduce or inhibit hydrogen sulphide emission, but are preferably faced with a finish coating containing the metal compound but no sulphurous component.

By virtue of this invention, sulphide-containing constituents may be safely used in building materials, whether in bricks, blocks panels or coating compositions, without the risk of unpleasant and undesirable release of hydrogen sulphide into the atmosphere in the building while the materials are subject to wet conditions. In particular, the advantageous properties of mixtures of gypsum plaster and quenched or granulated slag as coating compositions for building surfaces can be exploited without the disadvantages arising from hydrogen sulphide evolution.

The prior art discloses a number of compositions containing calcium sulphate or other cements together with compounds of metals which could form stable sulphides, and in particular zinc compounds, which are included for a variety of different purposes. Thus, in GB No. 1,106,954 zinc sulphate is used as an actuator for hemihydrate plaster in gypsum board manufacture. In GB No. 949,469 of zinc oxide is added to surgical bandage plaster for 'skin compatability'. In GB No. 603,666 zinc sulphate is used as a fungicide in a gypsum based decorating material. In GB No. 521,567 zinc oxide is used to increase the water resistance of anhydrite/silicate renderings, which in GB Nos. 524,928, 493,372 and 459,134 zinc sulphate appears as a well known accelerator for anhydrite. For use as an accelerator, the compound must be in a soluble ionic form.

A few prior publications make mention of both blast furnace slag and zinc compounds, but none is concerned with the problem of hydrogen sulphide, which may not have arisen with the slag samples concerned. In no case is zinc oxide employed with hemihydrate plaster, which is the preferred combination for the purposes of this invention. Once again, the zinc compounds are used for other purposes and in different proportions. In GB No. 1,099,109 zinc and iron sulphates as proposed are partial replacements for the more usual potassium sulphate as an accelerator for anhydrite in a rendering composed of 40–60% anhydrite, 30–50% blast furnace slag, 4–8% high alumina cement, 0.8–1.8% hydrated lime, 0.8–2.0% potassium sulphate. In GB No. 635,486, fire resistant structures and coverings are made from emulsions of synthetic thermoplastics containing cement, plaster of Paris, magnesium or zinc carbonate as fire retarder, and sand or crushed slag as reinforcing agent, but the proportions contemplated are very different from those of the present invention, for example 64 parts by weight ciment fondu, 16 parts plaster of Paris, 30 parts PVA emulsion (50–55% solid), 8 parts asbestos floats, 6 parts magnesium carbonate, 22 parts slag, 40 parts water, and there is no reference to possible formation of hydrogen sulphide or to any reaction of such gas with the metal carbonates.

Any metal compound that reacts promptly with hydrogen sulphide to form a stable metal sulphide can in principle be used for the purposes of this invention. However, it is preferable that a metal should be used that forms a colourless or only weakly coloured sulphide. A metal forming a colourless sulphide is clearly preferable for a finish coating although it may be permissible to use a metal forming a more coloured sulphide for an undercoat composition. An insoluble, stable sulphide permanently removes the sulphur from the system. The present preferred compounds are zinc compounds, and it has been found that surprisingly little of these compounds is required, the quantity being much less than would be expected on a stoichiometric basis, in relation to the proportion of sulphide-containing material and the percentage of sulphide in the material.

It is also desirable that the metal compound should not interfere in the setting of the coating composition in which it is used, although it may be possible to offset such effects by the use of further additives. The use of a metal compound which is insoluble, although still being capable of reaction with hydrogen sulphide, minimizes the effect on the setting rate. For example, where zinc is the metal, zinc sulphate is an effective compound for preventing the release of hydrogen sulphide but has an accelerating effect on the setting of gypsum plaster. Since an accelerated plaster is unsuitable for ordinary plastering work, the use of zinc sulphate as the metal compound would require the addition of further retarder to compensate for the accelerating effect. Zinc oxide, on the other hand, has little effect on the setting rate of gypsum plaster and is accordingly the preferred metal compound for the purposes of this invention. It does, however, have some influence on the setting or hardening reactions of slag and, although we prefer to include zinc oxide in slag-containing surface coating compositions, the proportion of zinc oxide should be limited in relation to the proportion of slag to the extent that the setting of the latter is not impaired. Another zinc compound which is a possible metal compound additive for the purposes of the invention is zinc carbonate.

In accordance with a preferred aspect of the invention, we have found that compositions containing substantial quantities of quenched or granulated slag, to give coatings of quick surface drying and good wet strength properties, can only tolerate limited additions of metal compounds such as zinc oxide, if the advantages of the slag component are to be retained, and that such limited additions may be insufficient to prevent hydrogen sulphide emission in the long term. This is particularly true in the case of compositions containing a high proportion of slag to gypsum plaster, which are particularly valuable for coating walls and other surfaces in buildings which by reason of external circumstances are in a wet condition when the coating has to be applied. In these circumstances, we prefer to keep the level of metal compound in the coating compositions to that at which the overall properties of the composition are not impaired, and to apply over coating a finish layer of a composition containing little or no sulphide-containing component, but a quantity of the metal compound sufficient to prevent passage of hydrogen sulphide from the layer beneath. A thin layer of such a finishing composition need not involve the disadvantages of slow surface drying which might otherwise arise with purely plaster based surface coatings under poor drying conditions.

For general application as an undercoat or rendering composition, a composition according to the invention should contain gypsum plaster (and more especially hemihydrate) in the approximate range from 20 to 84%, ground blast furnace slag in a quantity of from 79 to 15%, and zinc oxide in an amount of from 0.01 to 1.00% depending on the proportion of slag (all these percentages being by weight), preferably together with small proportions of portland cement and lime. The resulting compositions can be extended with light-weight aggregates and their setting time may be adjusted by the use of conventional retarders.

Within such broad ranges of proportions may be distinguished two classes of coating composition. The first is an undercoat composition for general application, which preferably contains from 64 to 84% hemihydrate plaster, 15 to 35% ground blast furnace slag, 0 to 5% portland cement, 0 to 5% lime, and 0.02 to 0.10 zinc oxide, ignoring for the purposes of these proportions such additives as retarders, viscosity control additives, for example cellulose ethers, and also possible aggregates such as expanded perlite and exfoliated vermiculite which may be added in the proportions of 5 to 20% of the total composition.

For use under very wet conditions, for example in the renovation of decayed buildings, the increased wet strength afforded by a higher proportion of slag is desirable. Such compositions preferably contain from 64% to 40% hemihydrate plaster, from 35 to 59% ground blast furnace slag, from 0 to 5% portland cement, from 0 to 10% lime and from 0.05 to 0.2% zinc oxide, again with the addition of additives and aggregates at similar levels to those already mentioned.

For the purposes of a finish coating, to be applied over a coating of the undercoat compositions already described, but also suitable for providing a hydrogen sulphide resistant finish on other sulphide-containing building materials, the preferred compositions comprise from 97.8 to 99.9% hemihydrate plaster, from 0 to 2% lime, and from 0.05 to 0.2% zinc oxide. Retarders and other additives may be included in the usual way, and a light-weight finish plaster can be provided by the inclusion of a light-weight aggregate such as exfoliated vermiculite in a proportion of from 0.5 to 5.0% of the total composition.

The preferred slag component in these compositions is quenched or granulated blast furnace slag, ground to a suitable particle size, which has been found to contain sulphides leading to the slow release of hydrogen sulphide gas as a result of chemical reaction between the sulphide and the aqueous component of the coating composition. Such a slag material is available under the trade designation "Cemsave". Such materials are used as extenders for cements, and the protective aspects of the present invention can be utilized in association with coatings, castings or prefabricated building components incorporating much slag products or other materials having a sulphide content which is liable to react under wet conditions with the release of hydrogen sulphide.

A particularly preferred system in accordance with this invention comprises a wall, ceiling or other building structure having a first coating of a cementitious composition comprising gypsum plaster and ground blast furnace slag together with a small quantity of a metal compound such as zinc oxide, for example in accordance with the undercoat formulations given above, and a second or finish coating of a cementitious composition containing gypsum plaster and zinc oxide, for example according to the finishing composition formulation given above. In such a system, the amount of zinc oxide in the undercoat is sufficient to prevent the emission of undesirable hydrogen sulphide during the initial stages, while the undercoat is exposed, although insufficient to neutralise the total hydrogen sulphide emission in the long term. The release of hydrogen sulphide into the atmosphere in the long term, however, is effectively prevented by the zinc oxide present in the finish layer.

The following are examples of specific preferred formulations for the various types of composition discussed above. All percentages are given by weight.

EXAMPLE 1

The following are formulations for an undercoat plastering composition for general use (A) and one for use in wet conditions (B), to which may be added the usual aggregate and additives, which have been omitted in calculating the percentages.

|  | A | B |
|---|---|---|
| Stucco | 76.95 | 56.51 |
| Slag | 19.19 | 37.67 |
| Portland Cement | 1.90 | 3.80 |
| Lime | 1.90 | 1.90 |
| Zinc Oxide | 0.06 | 0.12 |
|  | 100.00 | 100.00 |

EXAMPLE 2

The following are examples of formulations for general use (A) and for use under wet conditions (B) including retarder and light-weight aggregate.

|  | A | B |
|---|---|---|
| Stucco | 64.95 | 47.7 |
| Slag (Cemsave) | 16.2 | 31.8 |
| Portland Cement | 1.6 | 3.2 |
| Lime | 1.6 | 1.6 |
| Keratin | 0.6 | 0.6 |
| Perlite | 15.0 | 15.0 |
| Zinc Oxide | 0.05 | 0.1 |
|  | 100.00 | 100.00 |

EXAMPLE 3

The following is an example of a finish coating composition which does not contain slag but contains zinc oxide for the purposes of the invention:

| Stucco | 97.84 |
|---|---|
| Lime | 0.98 |
| Retarder | 0.09 |
| Zinc Oxide | 0.05 |
| Vermiculite | 1.04 |
|  | 100.00 |

In these examples, the zinc oxide employed may be a general purpose grade as sold for use in the rubber, paint, ceramic and glass industries, for example having a purity of 99.8% and not more than 0.15% lead, and a surface area of about 5 $m^2 g^{-1}$ (by the air permeability method). Analytical Reagent grade zinc oxide was also found to be satisfactory.

We claim:

1. A method of utilizing gypsum surface covering compositions containing sulphide-containing components for building structures without the emission of hydrogen sulphide from the covered structure, which method comprises:
incorporating in said composition at least one zinc compound capable of reacting with hydrogen sulphide in an amount of from about 0.01 to about 0.2% of the dry solid components of said composition to prevent the emission of hydrogen sulphide from the covering.

2. The method of claim 1, wherein said zinc compound is zinc oxide.

3. The method of claim 2 in which a first layer of a composition including a sulphide-containing constituent is first applied to said structure and thereafter a second layer of said zinc oxide containing surfacing composition is applied over said first applied composition.

4. A method for suppressing emission of hydrogen sulphide from a building structure coated with a surfacing composition comprising slag gypsum plaster and water wherein the method comprises incorporating in a gypsum surfacing composition from about 0.01 to about 0.2% of at least one zinc compound capable of reacting with hydrogen sulphide to form a stable sulphide; coating said structure with said gypsum surfacing composition and allowing said zinc compound to react with hydrogen sulphide evolved from a sulphide-containing constituent which is present in the building structure or in the surfacing composition.

5. The method of claim 4 in which said surfacing composition includes a sulphide containing constituent which comprises aggregate, latent cement blast furnace slag or pozzolan.

6. The method of claim 4 in which the solid components of said surfacing composition comprises by dry weight from 20 to 84% gypsum plaster, from 15 to 79% blast furnace slag, 0.2% of said metal compound.

7. The method of claim 4 in which said structure includes a sulphide-containing constituent and said gypsum surfacing composition comprises by weight from 97.8 to 99.9% gypsum plaster, 0 to 2% lime and 0.5 to 0.2% zinc oxide.

8. The method of claim 4 in which a first layer of a composition including a sulphide-containing constituent is first applied to said structure and thereafter a second layer of said zinc compound containing surfacing composition is applied over said first applied composition.

9. The method of claim 8 wherein said first applied layer contains from 0.01 to 0.2% zinc compound and said second applied layer contains from 0.01 to 0.2% zinc compound.

10. The method of claim 9 in which said first applied layer contains about 0.05 to 0.12% zinc oxide and said second applied layer contains about 0.05% zinc oxide.

11. A method for suppressing emission of hydrogen sulphide from a building structure coated with a surfacing composition comprising slag gypsum plaster and water wherein the method comprises incorporating in a gypsum surfacing composition from about 0.01 to about 0.2% of zinc oxide: coating said structure with said gypsum surfacing composition and allowing said zinc oxide to react with hydrogen sulphide evolved from a sulphide-containing constituent which is present in the building structure or in the surfacing composition.

12. The method of claim 11 in which said gypsum surfacing composition includes a sulphide containing constituent which comprises aggregate, latent cement blast furnace slag of pozzolan.

13. The method of claim 11 in which the solid components of said gypsum surfacing composition comprises by dry weight from 20 to 84% gypsum plaster, from 15 to 79% blast furnace slag, and an effective amount of from about 0.01 to 0.2% of said zinc oxide compound.

14. The method of claim 11 in which said structure includes a sulphide-containing constituent and said gypsum surfacing composition comprises by weight from 97.8 to 99.9% gypsum plaster, 0 to 2% lime and 0.05 to 0.2% zinc oxide.

* * * * *